United States Patent [19]

Van Twist et al.

[11] Patent Number: 4,875,207
[45] Date of Patent: Oct. 17, 1989

[54] A DATA PROCESSING NETWORK WITH CHORDAL RING FACTOR NETWORK

[75] Inventors: Robert A. H. Van Twist; Franciscus P. M. Hopmans; Eddy A. M. Odijk, all of Eindhoven, Netherlands

[73] Assignee: U.S. Philips Corporation, New York, N.Y.

[21] Appl. No.: 7,155

[22] Filed: Jan. 27, 1987

[30] Foreign Application Priority Data

Jan. 30, 1986 [NL] Netherlands ............... 8600218

[51] Int. Cl.⁴ ............................................. H04L 11/00
[52] U.S. Cl. .................................. 370/85.12; 364/900
[58] Field of Search .................... 370/86, 87, 88; 340/825.01, 825.05; 364/200, 900

[56] References Cited

U.S. PATENT DOCUMENTS

| | | | |
|---|---|---|---|
| 4,466,064 | 8/1984 | Martin | 364/200 |
| 4,580,215 | 4/1986 | Morton | 364/200 |
| 4,644,496 | 2/1987 | Andrews | 364/900 |
| 4,672,373 | 6/1987 | Mori et al. | 370/86 |
| 4,720,780 | 1/1988 | Dolecek | 370/61 |
| 4,736,465 | 4/1988 | Bobey et al. | 370/88 |
| 4,742,511 | 5/1988 | Johnson | 370/88 |

Primary Examiner—Douglas W. Olms
Assistant Examiner—Melvin Marcelo
Attorney, Agent, or Firm—Thomas A. Briody; Jack E. Haken; Anne E. Barschall

[57] ABSTRACT

A description is given of a data processing network that is constructed as a product network of two or more factor networks. At least one of the factor networks is a chordal ring of at least five stations, or a generalized chordal ring. A generalized chordal ring is formed by dividing each of the stations in a chordal ring (124, 130, 136) into a number of sub-stations. The sub-stations within a station constitute a homogeneous network. The external connections of a station are divided over the relevant sub-stations. In this way an optimum value for the degree (G) and diameter (D) of the network can be chosen on the basis of a selection strategy.

8 Claims, 8 Drawing Sheets

| | | | | | | | |
|---|---|---|---|---|---|---|---|
| 4 | 14 | 1060 | F1, 1 | P3, 13 | | | |
| 5 | 11 | 1098 | R2, 4 | P3, 7 | | | |
| 6 | 11 | 1017 | R2, 4 | C4, 7 | | | |
| 6 | 10 | 1020 | F1, 1 | F2, 1 | P3, 8 | | |
| 7 | 8 | 1066 | P3, 4 | C4, 4 | | | |
| 7 | 8 | 1066 | P3, 6 | C4, 2 | | | |
| 8 | 7 | 1025 | C4, 3 | C4, 4 | | | |
| 8 | 8 | 1040 | F1, 1 | F1, 1 | P3, 2 | P3, 4 | |
| 9 | 7 | 1066 | F1, 1 | C4, 2 | C4, 4 | | |
| 9 | 7 | 1040 | F3, 1 | P3, 2 | P3, 4 | | |
| 9 | 6 | 1000 | P3, 2 | P3, 2 | P3, 2 | | |
| 10 | 6 | 1000 | F3, 1 | P3, 2 | C4, 3 | | |
| 10 | 7 | 1040 | F1, 1 | F1, 1 | F1, 1 | P3, 2 | C4, 2 |
| 11 | 7 | 1050 | F2, 1 | P3, 5 | F6, 1 | | |
| 11 | 7 | 1098 | F2, 1 | C4, 5 | F5, 1 | | |
| 11 | 7 | 1050 | R2, 3 | C4, 3 | F5, 1 | | |
| 11 | 6 | 1014 | F1, 1 | F2, 1 | C4, 2 | C4, 2 | |
| 11 | 6 | 1040 | F1, 1 | F3, 1 | P3, 2 | C4, 2 | |
| 11 | 6 | 1000 | F1, 1 | P3, 2 | P3, 2 | F4, 1 | |
| 12 | 6 | 1025 | F4, 1 | F4, 1 | C4, 4 | | |
| 12 | 6 | 1040 | R2, 2 | F3, 1 | F3, 1 | C4, 2 | |
| 12 | 6 | 1053 | F2, 1 | F2, 1 | F2, 1 | F2, 1 | C4, 2 |
| 12 | 6 | 1080 | F2, 1 | F2, 1 | F2, 1 | F3, 1 | P3, 2 |
| 13 | 6 | 1000 | R2, 2 | C4, 3 | F7, 1 | | |
| 13 | 5 | 1014 | C4, 2 | C4, 2 | F5, 1 | | |
| 13 | 6 | 1050 | F1, 1 | F2, 1 | C4, 3 | F6, 1 | |
| 14 | 5 | 1040 | P3, 2 | C4, 2 | F7, 1 | | |
| 14 | 5 | 1040 | F3, 1 | F3, 1 | F4, 1 | C4, 2 | |
| 14 | 5 | 1000 | F3, 1 | P3, 2 | F4, 1 | F4, 1 | |
| 15 | 5 | 1000 | P3, 2 | P3, 2 | F9, 1 | | |
| 15 | 5 | 1000 | F4, 1 | C4, 3 | F7, 1 | | |
| 15 | 5 | 1050 | C4, 3 | F5, 1 | F6, 1 | | |
| 15 | 5 | 1092 | F2, 1 | F3, 1 | C4, 2 | F6, 1 | |
| 15 | 5 | 1050 | F2, 1 | P3, 2 | F4, 1 | F6, 1 | |
| 15 | 5 | 1080 | F2, 1 | P3, 2 | F5, 1 | F5, 1 | |
| 15 | 5 | 1024 | F3, 1 | F3, 1 | F3, 1 | F3, 1 | F3, 1 |

FIG. 6a

| | | | | | | | |
|---|---|---|---|---|---|---|---|
| 16 | 5 | 1100 | P3, 2 | P3, 2 | F10, 1 | | |
| 16 | 5 | 1000 | F3, 1 | C4, 3 | F9, 1 | | |
| 16 | 5 | 1040 | F1, 1 | F4, 1 | C4, 2 | F7, 1 | |
| 16 | 5 | 1092 | F1, 1 | C4, 2 | F5, 1 | F6, 1 | |
| 16 | 5 | 1053 | F2, 1 | F2, 1 | C4, 2 | F8, 1 | |
| 16 | 5 | 1080 | F2, 1 | F3, 1 | P3, 2 | F8, 1 | |
| 16 | 5 | 1000 | F1, 1 | F3, 1 | F4, 1 | F4, 1 | F4, 1 |
| 16 | 5 | 1008 | F2, 1 | F2, 1 | F3, 1 | F3, 1 | F6, 1 |
| 16 | 5 | 1080 | F2, 1 | F2, 1 | F3, 1 | F4, 1 | F5, 1 |

FIG.6b

| G | D | N | TYP. |
|---|---|---|---|
| 13 | 5 | 1014 | 2*CR13, 1*FCN6 |
| 13 | 7 | 1024 | 3*FCN4, 4*FCN2 (GHC) |
| 9 | 6 | 1000 | 3*P10 |
| 10 | 10 | 1024 | 10*FCN2 (Bin) |
| 8 | 7 | 1025 | 1*CR41, 1*CR25 |
| 8 | 12 | 1024 | 2*R8 , 2*R4 |
| 4 | 14 | 1060 | 1*P530, 1*FCN2 |
| 4 | 32 | 1024 | 2*R32 |

FIG.6c

A DATA PROCESSING NETWORK WITH CHORDAL RING FACTOR NETWORK

DESCRIPTION

The invention relates to a data processing network, comprising a first set of data processing stations, in which each station is connected by respective lines to a maximum of G other stations, in which G, the degree of the network, is at least four, in order to exchange information between the stations via the said lines, in which the shortest connection path between two arbitrarily selected stations is composed of a maximum of D lines and in which D is the diameter of the network. The stations can be designed with varying degrees of complexity. Since the stations perform the aggregated data processing together, their performance can be (much) greater than that of a single station. In the parallel execution of the data processing a certain exchange of information is often necessary between the stations, for which purpose connection lines are required. The greater the number of receiving stations directly connected to the transmitting station, the faster the communication. The point is that one single station-to-station communication is often sufficient to reach the destination. For other connections a chain of two or more consecutive station-to-station communications is required in order to reach the destination. The greatest value of the smallest possible number of station-to-station communications required in order to connect an arbitrary pair of stations is called the diameter D of the network. The quality (performance) of the network can be estimated as proportional to $D^{-1}$. On the other hand, the aim is to achieve a small number of lines (G, the maximum of this number, is the degree of the network) per station. The costs of the network can be estimated as proportional to the product of the number of stations N and the number of connecting lines per station: a standardised quality parameter Q can be written as the product of D and G; the aim is to achieve a small value of this product at a particular value of N.

SELECTIVE FORMULATION OF THE OBJECT OF THE INVENTION

In particular, it is an object of the invention to achieve a small value of the diameter D when using a small number of lines per station by a sensible choice of the interconnection pattern, and with an uncomplicated internal construction of the stations to achieve a relatively fast and easily controllable transfer of information between an arbitrary pair of stations, doing all this with relatively large numbers of stations, in particular, of the order of $32 = 2^5$, $64 = 2^6$, $128 = 2^7$ or more, and with a highly regular construction of the data processing network.

SUMMARY OF THE INVENTION

The data processing network according to this invention is constructed as a product network of at least two factor networks, at least one factor network is constructed as a chordal ring, that is, a ring of stations in which all the stations are connected to the two immediately neighbouring stations and, in addition, to two further stations which are a same step size of at least two, but smaller than the number of stations in the ring divided by two, apart from the original station, all the connecting lines operate bi-directionally, the number of stations is at least 32, all the factor networks comprise at least two stations, and at least one chordal ring comprises at least five stations. In itself, on close examination it proves that a special case of a chordal ring is known from the U.S. Pat. No. 4,466,064 by Alain J. Martin, as will be explained later. The present invention is based on the insight that, in the first place, the above-mentioned chordal ring can be generalised, so that a greater freedom exists as regards the number of stations on the ring, the number of chords per station, and the size of the step for the chords, and that a chordal ring such as this can be used advantageously as a factor network of a product network of considerable size, from which a value of the quality factor can be found which is better than that of other categories of networks with the same number of stations. Another advantage is that the network is homogeneous within a chordal ring, in other words, all the stations in the chordal ring have the same image of the pattern of connection with the other stations in the chordal ring. This means that as far as the chordal ring is concerned, the program needed for achieving station-to-station connections within the chordal ring can be the same. Inhomogeneities in the network can then only occur in the case of a connection between a station in the chordal ring and a station not belonging to this chordal ring. In addition, it has proved that, particularly for a large number of stations, a product network as referred to can be relatively simple in construction. In particular, a product network is understood to mean a so-called Cartesian product network.

FURTHER ASPECTS OF THE INVENTION

It is advantageous if within at least one chordal ring each station consists of P sub-stations which are interconnected and each sub-station is connected to sub-stations within the same station and to further sub-stations by $R < 2$ lines. It has been found that with a reduction in the degree which applies to the relevant stations this results in only a small increase in the diameter of the network and, under certain circumstances, in an improved quality factor. Under certain circumstances, it is quite possible that the homogeneity of the chordal ring, as seen from the level of a sub-station, will cease to exist.

BRIEF DESCRIPTION OF THE FIGURES

The invention is further explained on the basis of some figures.

Some definitions and fundamental characteristics of networks are first given in the description, after which a number of embodiments are discussed.

SOME DEFINITIONS

Definitions of some terms which occur in the further description are given below. A network is formed by a number of stations, in which respect each station is connected to at least one other station, and hence indirectly to all the other stations in the network. The degree of a network (G) is the highest number of connecting lines starting from any station. A ring (R) of stations is a series of stations coupled end-around, in which each station is directly-connected to its predecessor and to its successor in the series. A chordal ring of stations comprises a ring of stations, in which each station is connected to two or more other stations which are situated along the ring at a fixed step size (modulo the length of the ring) greater than one from the starting station. (If the size of the step is equal to one, the relevant connection is already part of the ring itself.) If there are three chords per station, the ring is divided into two equal parts by one of the chords. If there are two chords per station, the sizes of the steps are each other's opposite, for example, +2 and −2. If there are four chords, the sizes of the steps are each other's opposite in pairs, for example, +2, −2, +6, −6. A completely connected network is a number of stations in which each station is directly connected to all the other stations (FCN). An automorphism of a network is a permutation of the vertices of the network, in which each vertex is mapped on one other vertex, and in addition all the immediately adjacent vertices of a vertex in the original network are mapped on vertices which are immediately adjacent to the mapping of the original vertex. Two vertices are termed similar if there is an automorphism which maps one vertex on the other vertex. A homogenous network is a network in which each pair of vertices corresponds. A chordal ring can be described mathematically as a so-called circulant graph. A generalised chordal ring is a chordal ring in which each station is divided into a number of sub-stations, in which respect all the sub-stations within the station are interconnected in a sub-network, and in which respect the external connections of the station are connected across the respective sub-stations. If a station has four external connections, and there are two sub-stations, each sub-station can have two external connections. If a station in this case has three sub-stations, the external connections can be connected across the sub-stations in the relation 1-2-1. In the latter case the network within the station is homogeneous at the level of the sub-stations. It is no longer homogeneous if the connection is considered between a sub-station and another station, or a sub-station belonging to another station, respectively. Such a generalised chordal ring can be described mathematically as a metacirculant graph. A product of two networks with a set of vertices V1 and V2, respectively, consists of a number V1 times the set of vertices V2 (or a number V2 times the set of vertices V1). The number of vertices in the product network is then the product of the numbers V1 and V2. The number of connections originating from a vertex is the sum of the number of connections in the first factor network and the number of connections in the second factor network. Two points u, with location numbers u1 and u2 in the respective factor networks and v, with location numbers v1 and v2 in the respective factor networks, are directly connected in the product network if u1=v1 and (u2,v2) are directly inter- connected in the second factor network or if u2=v2 and (u1,v1) are directly connected to each other in the first factor network. The number of connections in the product network is therefore equal to the number v1 times the number of connections in the second factor network, plus the number v2 times the number of connections in the first factor network. It will be clear that a product of two networks, in turn, forms a network. Furthermore, all kinds of degenerations can occur in the networks discussed. For example, a network of two stations has only one connection and is therefore both a ring and a chordal ring, as well as a completely connected network. It is again pointed out that the product referred to is always a so-called Cartesian product.

DESCRIPTION OF A NUMBER OF CHORDAL RINGS

Figure 1A:
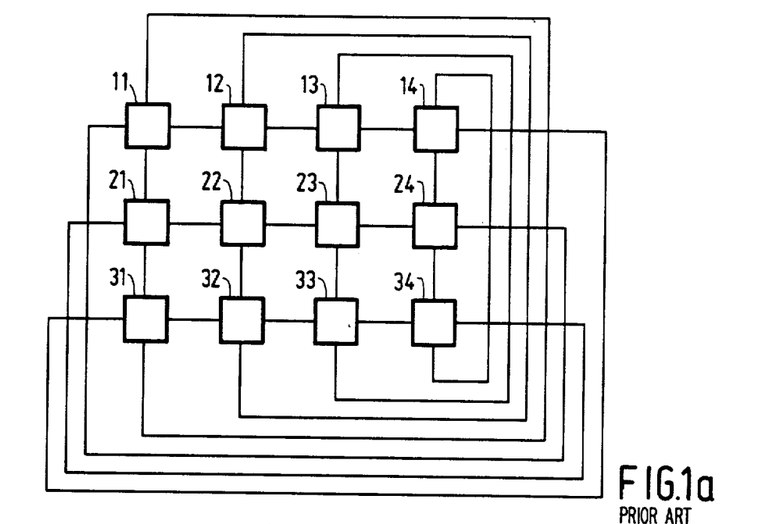
FIGS. 1a and 1b give two representations of a known chordal ring.
Figure 1B:
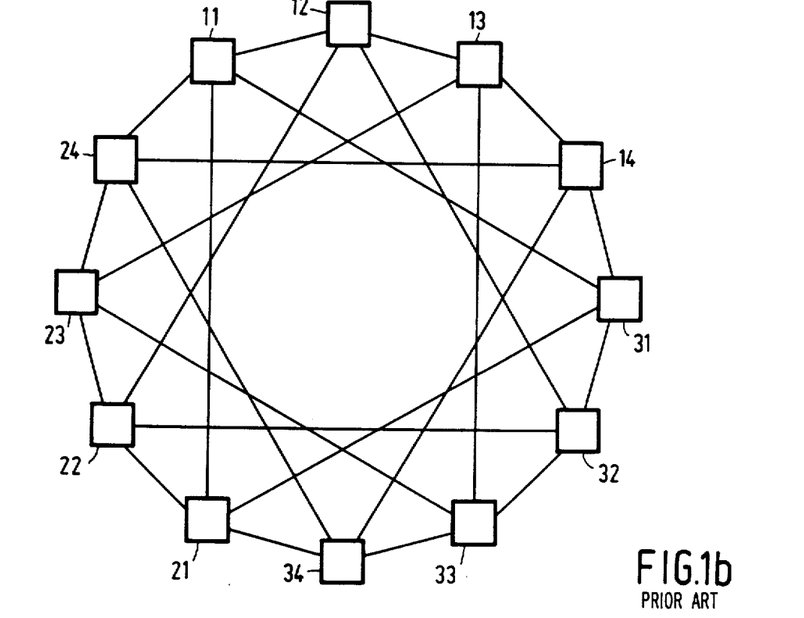

A number of examples of chordal rings is discussed below, in which the number of connections originating from a station within the chordal ring is limited to four. The stations themselves may be elementary in construction, for example, a single-chip microprocessor. They can also be more complicated, with a local processor with an arithmetic and logic unit (ALU), program ROM, register set and bus, as well as a data RAM, memory management unit and adaptor unit for connection to other stations and possibly a connection to outside the network. In itself, a network of stations is extensively described in the United States patent referred to. The hardware within a station and a sub-station, respectively, is regarded as requiring no further description here. FIGS. 1a and 1b give two illustrations of the chordal ring according to the state of the art. In FIG. 1a the stations constitute a rectangular array of 3×4 stations. Within the rows, each station is connected to the station or stations immediately adjacent to it. Within the columns the stations are interconnected in a ring. Finally, station 14 is connected to station 31, station 24 to station 11, and station 34 to station 21. In FIG. 1b the stations are positioned like the full hours on a clock. The ring is formed by the horizontal connections in FIG. 1a. The two chords per station are formed by the vertical connections in FIG. 1a. The stations are numbered correspondingly. The diameter D of the network is 3. It can be seen that the diameter of this network is relatively large. This is for a network of pxq stations, set up according to the principle shown of staggering the row connections equal to (entier (p/2)+(entier (q/2)). The expression "entier" means that the result is equal to the largest natural number that is not greater than the expression on which "entier" operates.

Figure 2A:
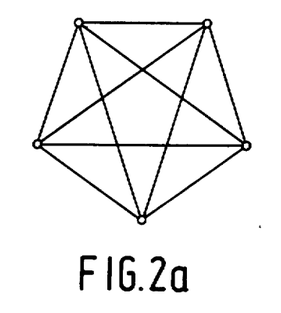
FIGS. 2a-2j give various examples of chordal rings according to which structure a factor network of stations can be built up.
Figure 2B:
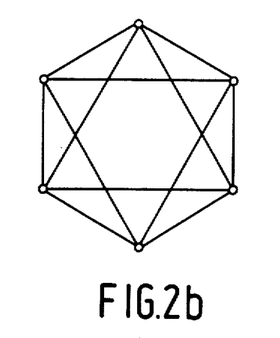
Figure 2C:
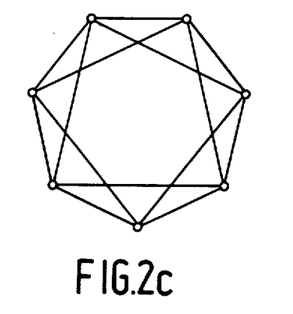
Figure 2D:
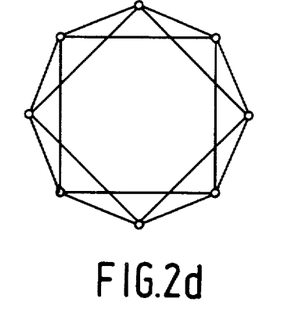
Figure 2E:
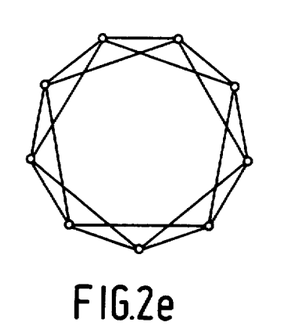
Figure 2F:
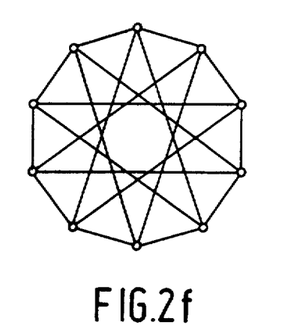
Figure 2G:
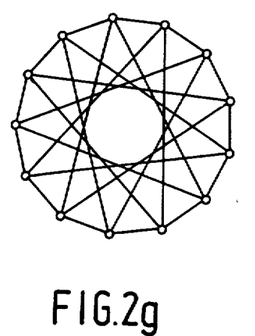
Figure 2H:
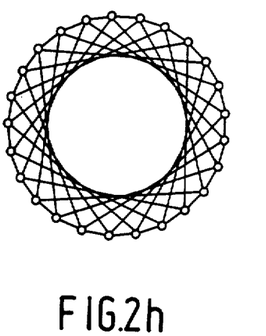

FIGS. 2a-2j give various examples of chordal rings according to which structure a network of stations can be constructed. FIG. 2a shows a chordal ring with N=5 and D=1. FIG. 2b shows a chordal ring with N=6, step size S=2 and D=2. In FIG. 2c N=7, S=2 and D=2. In FIG. 2d N=8, S=2 and D=2. In FIG. 2e N=9, S=2 and D=2. In FIG. 2f N=10, S=3 and D=2. FIG. 2a therefore shows the most complicated chordal ring with D=1. FIG. 2g shows the largest chordal ring with G=4 and D=2. For this purpose N=13 and S=5. FIG. 2h gives the largest chordal ring with G=4 and D=3. For this purpose N=25 and S=7. It is further pointed out that all the networks dealt with up to now are homogeneous. The advantages of a homogeneous network are, among other things, that:

(a) the diameter of the network as seen from each of the stations is the same (b) the routing program can be the same in each of the stations.

Figure 2I:
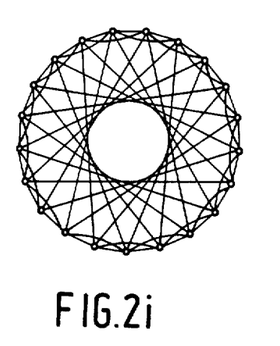

FIG. 2i shows an advantageous chordal ring in which four chords originate from each station. The number of stations is 21. The step sizes of the chords are 2 and 8. The diameter of the network is D=2. Comparison with FIG. 2h yields Q=4×3=12 (FIG. 2h) and $Q=6\times2=12$ (FIG. 2i), respectively. The choice will then again depend on other peripheral conditions, for example, the number of stations that is in fact necessary.

Figure 2J:
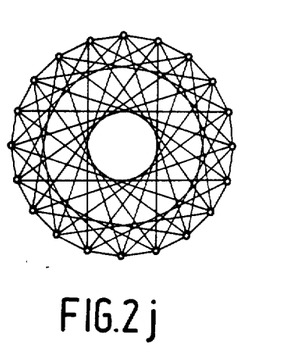

FIG. 2j shows a further chordal ring with $G=6$. The step sizes are 5 and 8, respectively. The size of the network is $N=20$ and the diameter $D=2$.

DESCRIPTION OF SOME GENERALISED CHORDAL RINGS

Figure 3A:
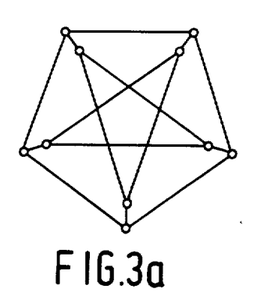
FIGS. 3a-3j give various examples of chordal rings which are extended by virtue of the fact that each station is sub-divided into sub-stations.
Figure 3B:
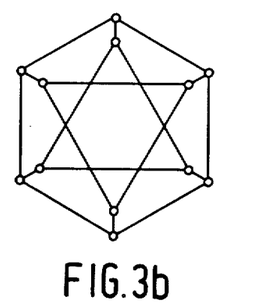
Figure 3C:
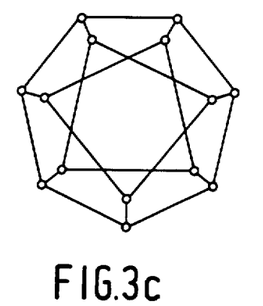
Figure 3D:
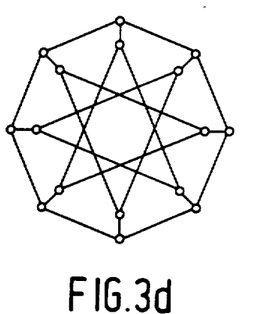
Figure 3E:
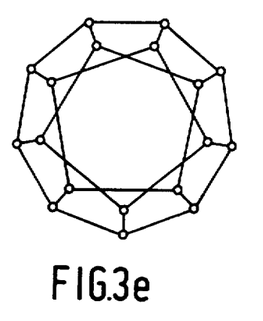
Figure 3F:
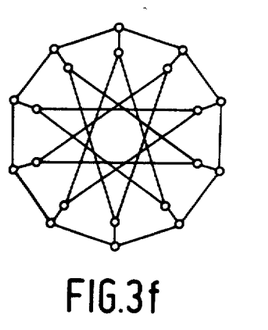
Figure 3G:
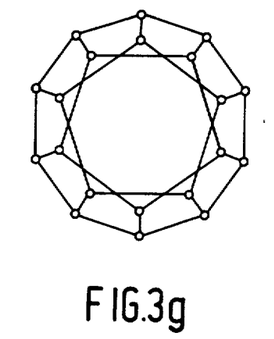
Figure 3H:
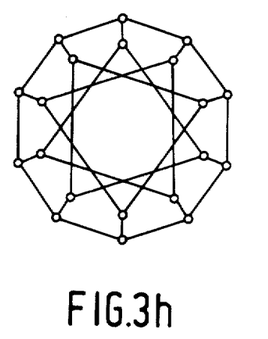
Figure 3I:
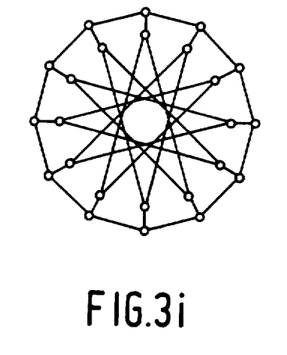
Figure 3J:
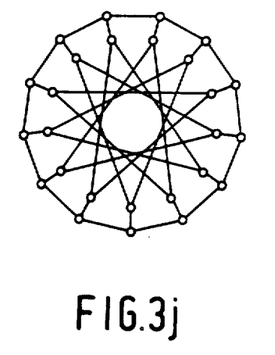

FIGS. 3a-3j give various examples of chordal rings which are generalised or expanded by virtue of the fact that each station is sub-divided into two sub-stations. As in FIG. 2a, the sub-stations are the stations indicated by circles. The number of stations in the FIGS. 3a-3f corresponds to FIGS. 2a-2f, respectively. In FIG. 3g the number of sub-stations is $N=2\times10=20$, $S=2$ and $D=5$. In FIG. 3h $N=2\times10=20$, $S=3$ and $D=5$. In this case the diameter is the same as in FIG. 3g and the distance profile is also the same 1.3.6.3.1 (a symmetrical profile is optimum here). In FIG. 3i $N=2\times12=24$, $S=5$ and $D=4$ (profile 1.3.6.9.5). In FIG. 3j, $N=2\times13=26$, $S=5$ and $D=4$ (profile 1.3.6.12.4). The distance profile of a homogeneous network is understood to mean the list of numbers of stations which are at a distance of 0,1,2, . . . from a particular original station. The first number is therefore always 1 and the second number indicates the degree of the network.

FURTHER DETAILS

Figure 4A:
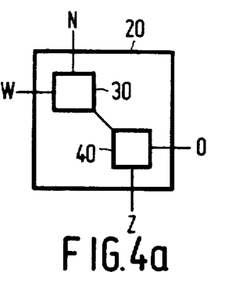
FIGS. 4a-4c give some examples of the division of a station into sub-stations.
Figure 4B:
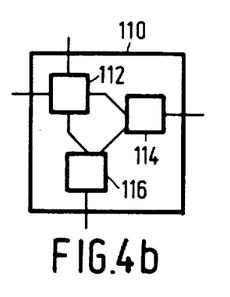
Figure 4C:
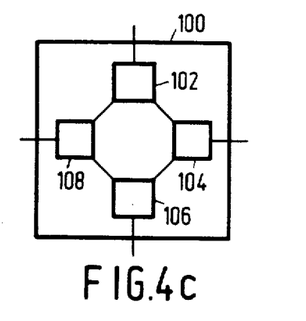

FIGS. 4a-4c give some examples of the division of a station into sub-stations. FIG. 4a shows a station 20 with four external connections. This is divided over two sub-stations 30 and 40, each with two external connections and one internal connection. A station of this kind can therefore always be used in the networks according to FIGS. 3a-3j. Each pair of circles in these figures which are closest together in the radial direction constitute a station of this kind. FIG. 4b also shows a station with four external connections. This station 110 is divided over three sub-stations 112, 114 and 116 with two, one and one external connections, respectively, and two internal connections in each case. Here the network is not homogeneous when seen from the sub-stations with respect to the part of the network outside the relevant station. A station with three external connections can be constructed in the same way by omitting one external connection of sub-station 112. By using a station of this kind with three sub-stations for each station of a chordal ring, a homogeneous network can again be created. FIG. 4c shows a station with four external connections. This station 100 is divided over four sub-stations 102, 104, 106 and 108, each with one external connection and two internal connections. In this further case, too, a homogeneous network can be created by application in a chordal ring. Other sub-divisions of a station can be realised in a similar manner. In this respect, the sub-stations can again be constructed in a similar manner to that already described for a single station and in the patent specification referred to, respectively.

THE FORMATION OF A PRODUCT NETWORK

Figure 5:
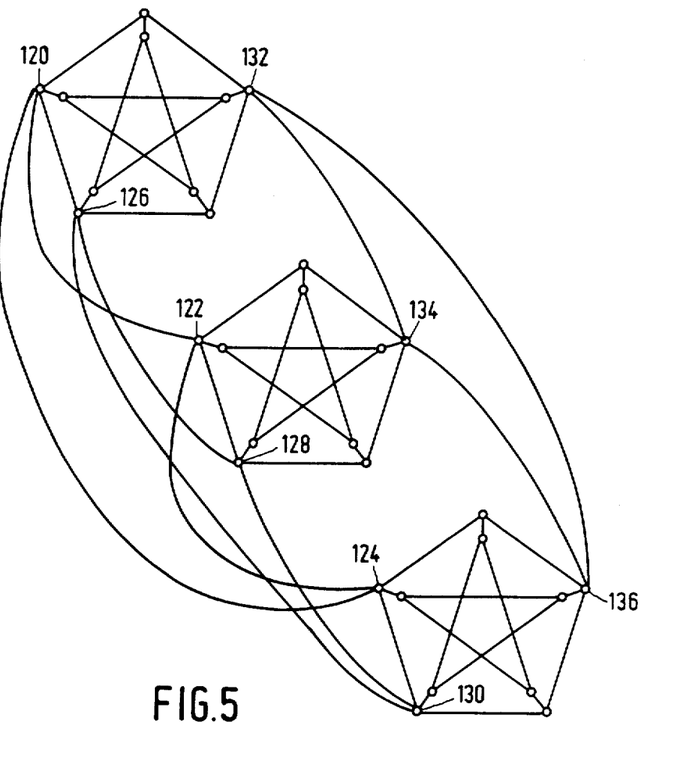
FIG. 5 gives an example of a product network.

FIG. 5 presents an example of a product network. The first factor network is the one already shown in FIG. 3a. This therefore comprises ten (sub)stations. The second factor network is a ring of three stations, which fulfil the role of sub-stations in the network in FIG. 3a. As already stated, the construction of a sub-station can have the same simplicity or complexity as a station in an ungeneralised chordal ring. The second factor network is therefore at the same time a fully connected network. The product network is built up from two factor networks. The chordal ring of ten sub-stations is realised physically three times in the product network. The fully connected network of three stations is realised ten times in the product network. For the sake of simplicity only three of these rings are indicated; these comprise, respectively, the (sub)stations 120/122/124; 126/128/130; 132/134/136. For the sake of simplicity the other rings have been omitted. Other product networks can be formed in a similar manner. In this respect, chordal rings, extended chordal rings and fully connected networks can be used as factor networks. Other possibilities are ordinary rings (without chords), while a product network can also be used as a factor network in order to realise a product network of higher degree. In this respect, the formation of a product network with the aid of any factor network means that all the vertices in the network are part of one of the physical realisations of the relevant factor network. Accordingly, if a network has A vertices and the factor network has B vertices, then the network divisible into A/B, which is a whole number, times a physical realisation of the relevant factor network.

REALISABLE PRODUCT NETWORKS

Figure 6A:
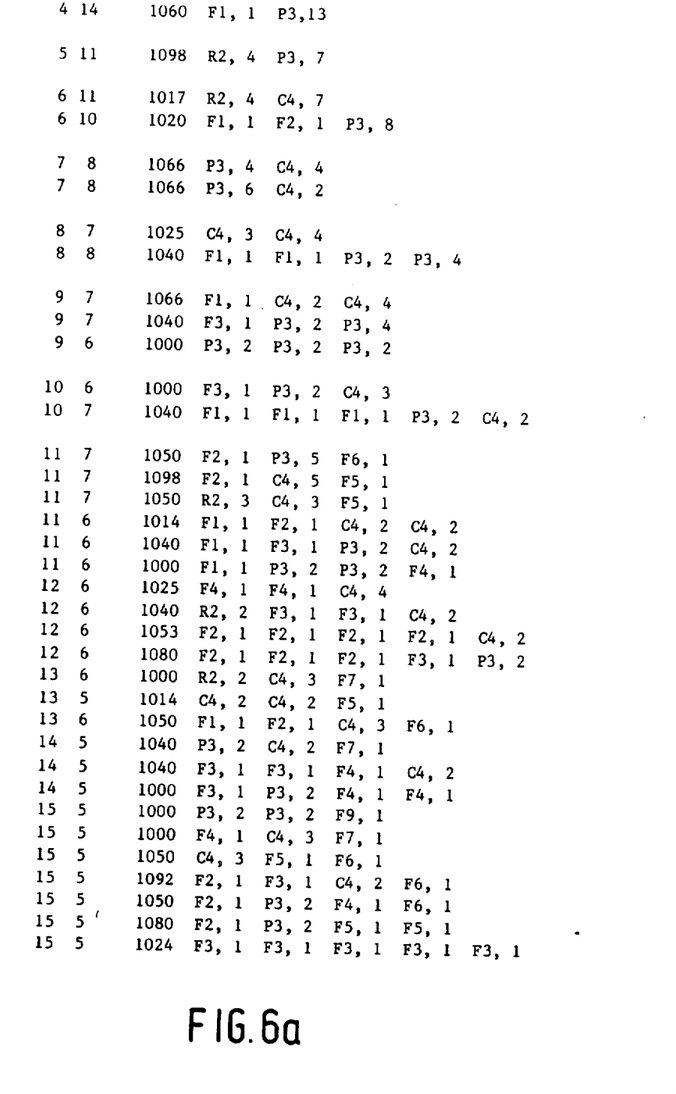
FIGS. 6a, 6b and 6c give some results of the values to be achieved for network diameters.
Figure 6B:
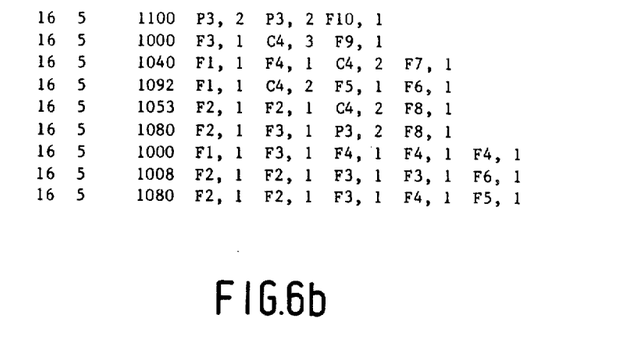
Figure 6C:
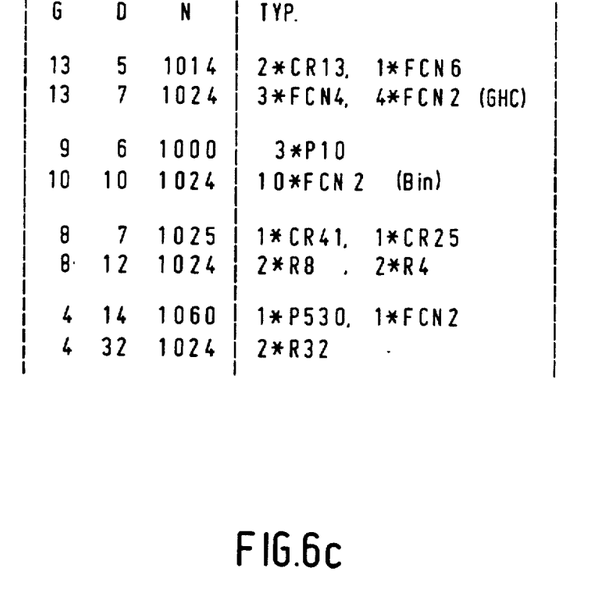

From the building blocks given in FIGS. 2a-2j, 3a-3j and 4a-4c many product networks can now be constructed. From FIG. 5 it can already be seen that these can only be visualised imperfectly if they are of any appreciable size. For this reason FIGS. 6a, 6b and 6c give some results for network parameters which can be achieved. At a given degree G and a given diameter D there are formulas for the maximum number of stations in a chordal ring. For $G=4$ we have: $N_{max}=2D^2+2D+1$. For the generalised chordal ring, in which each station is divided into two sub-stations, we therefore have a maximum number of sub-stations which is twice as high. As a rule, generalisation reduces the degree of the network by one and increases the diameter by two. It is only if the diameter is equal to one that this is increased by only one (compare FIGS. 2a/3a). In the case of a ring, the number of stations is at most equal to $2D+1$.

FIGS. 6a and 6b give some results for values which can be achieved for the network parameters. FIGS. 6a and 6b give all kinds of realisations for a network of at least 1000 stations and sub-stations, respectively (the distinction between these two is disregarded from now on). The uniform degree G of the stations is plotted in the first column. The diameter D is plotted in the second column. The third column shows the number of stations realised. Realisations with more than 1100 stations are not given. The networks of which they consist are given in the other columns. Here Ci,j is a chordal ring of degree i (here $G=4$ in every case) and diameter $D=j$. In this respect, the largest possible chordal ring is always chosen, with $N=N_{max}$. In addition, Pi,j is a generalised chordal ring derived from the above-mentioned chordal ring by dividing each station into two sub-stations. In this case the degree of the generalised chordal ring is $G=i=3$ and j is the diameter D, in which respect the largest possible dimension at the relevant value of the diameter was again chosen. It is also pointed out that the generalised chordal ring P3,3 is not used because this is not directly connected with the ungeneralised chordal ring C4,1 according to the above-mentioned principle. In addition, Fi,j is a fully connected network. Here i=G is the degree of the fully connected network. The diameter of a fully connected network is by definition j=D=1. The dimension of a fully connected network is by definition N=G+1. In addition, Ri,j is a ring. The degree of a ring is by definition G=2. Here, too, the diameter is equal to j=D. The greatest possible dimension of the ring has again been taken for each diameter in every case. Within the restrictions outlined above and with $4 \leq D \leq 16$ this figure gives all the possible (product) networks.

FIG. 6c presents a table of some advantageous product networks according to the invention compared with a network of (approximately) the same degree and dimensions in which, however, no use has been made of generalised or ungeneralised chordal rings for a factor network. The grouping in the table corresponds more or less to that in FIG. 6a. The explanation of the lines is therefore:

Line 1 has two chordal rings of 13 stations each as factor networks (FIG. 2g), diameter D=2 and G=4, and a fully connected network of six stations with D=1 and G=5. The degree of the product network is then $4+4+5=13$; the diameter is $2+2+1=5$.

Line 2 gives a product network of three fully connected networks of four stations and four fully connected networks of two stations. The degree is then $3 \times (4-1) + 4(2-1) = 13$. The diameter is then $3+4=7$. The use of a chordal ring is advantageous with this degree. (GHC means generalised hyper cube).

The third line gives a product network of three times a generalised chordal ring of ten stations (FIGS. 3g and 3h). The degree of the product network is then $3 \times 3 = 9$. The diameter is then $3 \times 2 = 6$.

Line 4 gives a product network of ten times a fully connected network of two stations. Here the degree is $10 \times 1 = 10$ and the diameter is $10 \times 1 = 10$. In the case of stations with a degree of 10 at most the generalised chordal ring is advantageous.

The fifth line gives a product network of a chordal ring of 41 stations and a chordal ring of 25 stations (FIG. 2h). The first has a diameter of D=4 and the second of D=3. The product network therefore has a degree of $4+4=8$ and a diameter of $3+4=7$.

The sixth line gives a product network of two rings of eight stations each and two rings of four stations each. The product network then has a degree of $2+2+2+2=8$ and a diameter of $4+4+2+2=12$. In the case of stations with a degree of 8 at most chordal rings are advantageous.

The seventh line gives a product network of a generalised chordal ring of 530 stations with a diameter of 13 and a fully connected network of two stations. The product network has a degree of G=4 and a diameter of 14.

The eighth line gives a product of two rings of 32 stations. In this case the degree is also 4 but the diameter is D=32. Here again the (generalised) chordal rings are advantageous.

The procedure is therefore as follows: declare a degree. If this degree is equal to 3 the related generalised chordal ring is selected. If this degree is equal to 4 a selection is made from the possibilities of generalised chordal rings with a fully connected network of two stations versus a chordal ring. If this degree is equal to 5 a selection is made from:

(a) a generalised chordal ring with a fully connected network of three stations
(b) a chordal ring with a fully connected network of two stations.

If the degree is G=6 a selection is made from:

(a) a double generalised chordal ring
(b) a generalised chordal ring with a fully connected network of four stations
(c) a chordal ring with a fully connected network of three stations, and so on for a higher value of the permissible degree.

Depending on the total number of stations, the selection will have to fall on one possibility or the other. There is no known analytical algorithm for making the choice.

What is claimed is:

1. A data processing network of degree $G \geq 4$ comprising:
    at least 32 data processing stations, each station connected by bidirectional communications lines to a maximum of G other stations in order to exchange information;
    said stations arranged as a product network of at least two factor networks;
    a first one of said factor networks arranged as a chordal ring of degree 4 including at least $N \geq 5$ of said stations and characterized by a step size S such that $2 \leq S \leq (N-1)/2$; and
    a second one of said factor networks comprising at least two stations.

2. A data processing network according to claim 1, comprising means for connecting each of the stations within said chordal ring to a further station within said ring in a homogeneous manner.

3. A data processing network according to claim 2 in which the second one of said factor networks is constructed as a chordal ring.

4. A data processing network according to claim 2, comprising at least one further factor network that is constructed as a completely connected network.

5. A data processing network according to claim 2 comprising at least one other factor network that is built up as a ring of at least four stations.

6. A data processing network according to any of claims 1 to 4 wherein each station within said first one of said factor networks comprises P interconnected sub-stations and each sub-station is connected to sub-stations within the same station and further sub-stations by $R \geq 2$ lines.

7. A data processing network according to claim 6, wherein within said first one of said factor networks P=2 and R=3.

8. The data processing network of claim 1 wherein said chordal ring comprises at least $N \geq 6$ stations and the degree of said chordal ring is less than or equal to $N-2$.

* * * * *